United States Patent [19]
Cohen et al.

[11] 3,855,283
[45] Dec. 17, 1974

[54] LEVO 1-AMINO-3-CHLORO-2-PROPANOL AND ACID ADDITION SALTS THEREOF

[75] Inventors: Elliott Cohen, Pearl River, N.Y.; Paul Rolf, River Vale, N.J.

[73] Assignee: American Cyanamid Company, Stamford, Conn.

[22] Filed: June 19, 1970

[21] Appl. No.: 47,873

Related U.S. Application Data

[63] Continuation-in-part of Ser. No. 845,491, July 29, 1969, abandoned.

[52] U.S. Cl......... 260/501.17, 260/584 R, 424/316, 424/325
[51] Int. Cl...................... C07c 91/02, C07c 91/04
[58] Field of Search................... 260/584 R, 501.17

[56] References Cited
OTHER PUBLICATIONS

Fry, Chemical Abstracts, Vol. 44, page 7,836g (1950).
Roth, Chemical Abstracts, Vol. 53, page 17,953f (1959).

*Primary Examiner*—Lorraine A. Weinberger
*Assistant Examiner*—Richard L. Raymond
*Attorney, Agent, or Firm*—Edward A. Conroy, Jr.

[57] ABSTRACT

This disclosure describes levorotatory 1-amino-3-chloro-2-propanol and anionic salts thereof useful as oral male antifertility agents.

4 Claims, No Drawings

LEVO 1-AMINO-3-CHLORO-2-PROPANOL AND ACID ADDITION SALTS THEREOF

CROSS REFERENCE TO RELATED APPLICATION

This application is a continuation-in-part of our co-pending application Ser. No. 845,491, filed July 29, 1969 now abandoned.

BRIEF SUMMARY OF THE INVENTION

This invention relates to levorotatory 1-amino-3-chloro-2-propanol and anionic salts thereof. This invention also relates to novel compositions of matter containing levo or racemic 1-amino-3-chloro-2-propanol or acid-addition salts thereof which inhibit fertility in male mammals. The invention includes the new compositions of matter and the method of inhibiting fertility in male mammals therewith.

DETAILED DESCRIPTION OF THE INVENTION

The compound 1-amino-3-chloro-2-propanol has one asymmetric carbon atom and thus exists in a dextrorotatory form, a levorotatory form, and as a racemic mixture. The racemic mixture has been resolved and it has been determined that the levorotatory form has substantially all of the antifertility activity.

The dextro, levo, and racemic 1-amino-3-chloro-2-propanol free bases form acid-addition salts with a variety of non-toxic pharmaceutically acceptable salt forming reagents. Thus, acid-addition salts, formed by admixture of the free base with an acid in a suitable solvent, are formed with such acids as sulfuric, phosphoric, hydrochloric, hydrobromic, sulfamic, citric, lactic, malic, succinic, tartaric, acetic, benzoic, gluconic, ascorbic, and realted acids. Although the levo and racemic 1-amino-3-chloro-2-propanol free bases may be used as such, they are more preferably administered in the form of their non-toxic acid-addition salts. For purposes of this invention, the levo and racemic 1-amino-3-chloro-2-propanol free bases are equivalent to their pharmaceutically acceptable acid-addition salts.

The effectiveness of levo and racemic 1-amino-3-chloro-2-propanol and salts thereof and the ineffectiveness of dextro 1-amino-3-chloro-2-propanol and salts thereof in inhibiting fertility in male mammals was determined by animal experiments as follows. Graded doses of test compound as the hydrochloride salt were administered orally, once daily for 14 days, to mature male rats weighing 300-325 grams. The composition to be administered was made up of propylene glycol and an appropriate amount of test compound, so that the desired dose was given by gavage in a 0.25 ml. volume. Control rats were given propylene glycol without the test compound. On treatment day 7, mature female rats weighing 225-250 grams were cohabited with the males in a ratio of four females to three males. Both male and female rats were adult Wistar strain rats, maintained on a standard laboratory diet of rat pellets and water, ad libitum. Three days after the last dose, the females were autopsied and examined for the presence of absence of fetal implantation sites. Thus, male rats sterility or fertility were assessed by their failure or success in impregnating the female rats. The results of this test, in representative operations, are set forth in Tables I, II and III below.

TABLE I

Levo 1-amino-3-chloro-2-propanol hydrochloride

| Dose (mg./kg. of body weight per day) | Number of male rats | Number of female rats pregnant/number of female rats cohabited |
|---|---|---|
| 7.5 | 3 | 0/4 |
| 15 | 3 | 0/4 |
| 30 | 3 | 0/4 |

TABLE II

Dextro 1-amino-3-chloro-2-propanol hydrochloride

| Dose mg./kg. of body weight per day) | Number of male rats | Number of female rats pregnant/number of female rats cohabited |
|---|---|---|
| 7.5 | 3 | 4/4 |
| 15 | 3 | 4/4 |
| 30 | 3 | 3/4 |
| 100 | 3 | —* |

*All male rats died at this dose level.

TABLE III

Racemic 1-amino-3-chloro-2-propanol hydrochloride

| Dose (mg./kg. of body weight per day) | Number of male rats | Number of female rats pregnant/number of female rats cohabited |
|---|---|---|
| 0 | 27 | 28/36 |
| 1 | 6 | 4/8 |
| 5 | 6 | 6/8 |
| 10 | 6 | 4/8 |
| 20 | 18 | 0/24 |

Levorotatory and racemic 1-amino-3-chloro-2-propanol and their non-toxic pharmaceutically acceptable acid-addition salts have thus been found to be highly useful oral male antifertility agents when administered in amounts within the range of from about one milligram to about 50 mg. per kilogram of body weight per day. A preferred dosage regimen for optimum results would be from about 5 mg. to about 20 mg. per kg. of body weight per day, and such dosage units are employed that a total of from about 0.25 gram to about 1.20 gram of active ingredient for a subject of about 70 kg. body weight are administered in a 24 hour period.

The levo or racemic 1-amino-3-chloro-2-propanol or their non-toxic acid-addition salts may be orally administered, for example, with an inert diluent or with an assimilable edible carrier, or they may be enclosed in hard or soft gelatin capsules, or they may be compressed into tablets, or they may be incorporated directly with the food of the diet. For oral administration, the active compounds of this invention may be incorporated with excipients and used in the form of tablets, troches, capsules, elixirs, suspensions, syrups, wafers, chewing gum, and the like. Such compositions and preparations should contain at least 0.1% of active compound. The percentage in the compositions and preparations may, of course, be varied and may conveniently be between about 5% to about 75% or more of the weight of the unit. The amount of active compound in such therapeutically useful compositions or preparations is such that a suitable dosage will be obtained.

Preferred compositions or preparations according to the present invention are prepared so that an oral dosage unit form contains between about 10 and 300 milligrams of active compound.

The tablets, torches, pills, capsules and the like may also contain the following: a binder such as gum tragacanth, acacia, corn starch or gelatin; an excipient such as dicalcium phosphate; a disintegrating agent such as corn starch, potato starch, alginic acid and the like; a lubricant such as magnesium stearate; and a sweetening agent such as sucrose, lactose or saccharin may be added or a flavoring agent such as peppermint, oil or wintergreen, or cherry flavoring. When the dosage unit form is a capsule, it may contain in addition to materials of the above type a liquid carrier such as a fatty oil. Various other materials may be present as coatings or to otherwise modify the physical form of the dosage unit, for instance, tablets, pills or capsules may be coated with shellac, sugar, or both. A syrup or elixir may contain the active compounds, sucrose as a sweetening agent, methyl and proyl parabens as preservatives, a dye and a flavoring such as cherry or orange flavor. Of course, any material used in preparing any dosage unit form should be pharmaceutically pure and substantially non-toxic in the amounts employed.

The invention will be described in greater detail in conjunction with the following specific examples.

EXAMPLE 1

Preparation of dl-1-phthalimido-3-chloro-2-propanol

A 7.35 g. (0.05 mole) sample of phthalimide was added to 15.0 g. (0.165 mole) of epichlorohydrin in a glass tube. After heating at 200°C. for 1.5 hours in a bomb, and cooling to room temperature, the contents of the tube were filtered to remove 1.1 g. of phthalimide. The filtrate was concentrated at 90.20 C./25 mm. to give 10.0 g. (80% yield) of colorless crystals, m.p. 80°-85 C. Recrystallization from benzene afforded an analytical sample, m.p. 90°-91°C.

EXAMPLE 2

Preparation of dl-1-amino-3-chloro-2-propanol hydrochloride

A 9.8 g. sample of dl-1-phthalimido-3-chloro-2-propanol was refluxed with 50 ml. of 20% hydrochloric acid for four hours. After chilling, the colorless crystals that precipitated were discarded and the filtrate was concentrated to yield 4.2 g. (57% yield) of product, m.p. 92°-95°C. Recrystallization from ethanol afforded an analytical sample, m.p. 102°-103°C. [Cherbuliez, Helv. Chim. Acta 43, 1158 (1960)].

EXAMPLE 3

Resolution of dl-1-amino-3-chloro-2-propanol

A solution of 54.0 g. (0.37 mole) of dl-1-amino-3-chloro-2-propanol hydrochloride in 200 ml. of methanol was cooled in an ice bath and an ice cold solution of 19.50 g. (0.362 mole) of sodium methoxide in 50 ml. of methanol was added with stirring. After filtering off the sodium chloride, the filtrate was concentrated in vacuo. The residual oil was dissolved in 200 ml. of ethanol and added to 136.3 g. (0.362) of d-dibenzoyltartaric acid ($[\alpha]_D 25 -111°$) dissolved in 1,400 ml. of ethanol. The resulting salt crystallized and was recrystallized several times from ethanol. A suspension of 69 g. of this dibenzoyltartrate salt in 200 ml. of ethanol was treated with hydrogen chloride gas until a clear solution resulted. Cooling and treatment with 800 ml. of diethyl ether yielded 19.1 g. of partially resolved product. Recrystallization of the product in ethanol afforded 5.04 g. of l-1-amino-3-chloro-2-propanol hydrochloride, m.p. 143°-145°C., $[\alpha]_D 25 - 22.2°(H_2O)$ In a similar fashion, d-1-amino-3-chloro-2-propanol hydrochloride, $[\alpha]_D 25 + 21.5°l(H_2O)$ was prepared using l-dibenzoyltartaric acid.

EXAMPLE 4

Preparation of tablet formulation

| Ingredient | Mg. per tablet |
|---|---|
| levo 1-Amino-3-chloro-2-propanol.HCl | 300 |
| Lactose | 200 |
| Corn starch (for mix) | 50 |
| Corn starch (for paste) | 50 |
| Magnesium stearate | 6 |

The active ingredient, lactose and corn starch (for mix) are blended together. The corn starch (for paste) is suspended in water at a ratio of 10 grams of corn starch per 80 milliliters of water and heated with stirring to form a paste. This paste is then used to granulate the mixed powders. The wet granules are passed through a No. 8 screen and dried at 120°F. The dry granules are passed through a No. 16 screen. The mixture is lubricated with magnesium stearate and compressed into tablets in a suitable tableting machine. Each tablet contains 300 mg. of active ingredient.

EXAMPLE 5

Preparation of oral syrup formulation

| Ingredient | Amount |
|---|---|
| levo 1-Amino-3-chloro-2-propanol.HCl | 5000 mg. |
| Sorbitol solution (70% N.F.) | 40 ml. |
| Sodium benzoate | 150 mg. |
| Sucaryl | 90 mg. |
| Saccharin | 10 mg. |
| Red dye (F.D. & C. No. 2.) | 10 mg. |
| Cherry flavor | 50 mg. |
| Distilled water, q.s. ad | 100 ml. |

The sorbitol solution is added to 40 ml. of distilled water and the active ingredient is suspended therein. The sucaryl, saccharin, sodium benzoate, flavor and dye are added and dissolved in the above solution. The volume is adjusted to 100 ml. with distilled water.

Other ingredients may replace those listed in the above formulation. For example, a suspending agent such as bentonite magma, tragacanth, carboxymethylcellulose or methylcellulose may be used. Phosphates, citrates or tartrates may be added as buffers. Preservatives may include the parabens, sorbic acid and the like and other flavors and dyes may be used in place of those listed above.

EXAMPLE 6

Preparation of tablet formulation

| Ingredient | Mg. per tablet |
|---|---|
| dl-1-Amino-3-chloro-2-propanol.HCl | 300 |
| Lactose | 200 |
| Corn starch (for mix) | 50 |
| Corn starch (for paste) | 50 |
| Magnesium stearate | 6 |

The active ingredient, lactose and corn starch (for mix) are blended together. The corn starch (for paste) is suspended in water at a ratio of 10 grams of corn starch per 80 milliliters of water and heated with stirring to form a paste. This paste is then used to granulate the mixed powders. The wet granules are passed through a No. 8 screen and dried at 120°F. The dry granules are passed through a No. 16 screen. The mixture is lubricated with magnesium stearate and compressed into tablets in a suitable tableting machine. Each tablet contains 300 mg. of active ingredient.

EXAMPLE 7

Preparation of oral syrup formulation

| Ingredient | Amount |
|---|---|
| dl-1-Amino-3-chloro-2-propanol.HCl | 5000 mg. |
| Sorbitol solution (70% N.F.) | 40 ml. |
| Sodium benzoate | 150 mg. |
| Sucaryl | 90 mg. |
| Saccharin | 10 mg. |
| Red dye (F.D. & C. No. 2) | 10 mg. |
| Cherry flavor | 50 mg. |
| Distilled water, q.s. ad | 100 ml. |

The sorbitol solution is added to 40 ml. of distilled water and the active ingredient is suspended therein. The sucaryl, saccharin, sodium benzoate, flavor and dye are added and dissolved in the above solution. The volume is adjusted to 100 ml. with distilled water.

We claim:

1. A compound selected from the group consisting of levo 1-amino-3-chloro-2-propanol and the non-toxic pharmaceutically acceptable acid-addition salts thereof.

2. levo 1-Amino-3-chloro-2-propanol free base.

3. levo 1-Amino-3-chloro-2-propanol hydrochloride.

4. levo 1-Amino-3-chloro-2-propanol acetate.

* * * * *

UNITED STATES PATENT OFFICE
CERTIFICATE OF CORRECTION

Patent No.  3,855,283  Dated  December 17, 1974

Inventor(s)  Elliott Cohen, Rolf Paul

It is certified that error appears in the above-identified patent and that said Letters Patent are hereby corrected as shown below:

Inventors:  "Paul Rolf" should read -- Rolf Paul --.

Column 3, line 37  "90.20 C./25 mm." should read

-- 90°C./25 mm. --.

Column 4, line 11  "+21.5°1"  should read -- +21.5° --.

Signed and sealed this 15th day of April 1975.

(SEAL)
Attest:

RUTH C. MASON
Attesting Officer

C. MARSHALL DANN
Commissioner of Patents
and Trademarks